United States Patent [19]

Phillips

[11] Patent Number: 4,621,519
[45] Date of Patent: Nov. 11, 1986

[54] BALLISTICS PRESSURE TRANSDUCER
[75] Inventor: Welton E. Phillips, Yuma, Ariz.
[73] Assignee: The United States of America as represented by the Secretary of the Army, Washington, D.C.
[21] Appl. No.: 665,862
[22] Filed: Oct. 29, 1984
[51] Int. Cl.[4] .................... G01L 23/10; G01L 23/28
[52] U.S. Cl. ......................... 73/35; 73/167; 73/706; 73/714; 73/754; 310/338
[58] Field of Search .................. 73/35, 167, 706, 754, 73/756, 714; 310/338

[56] References Cited

U.S. PATENT DOCUMENTS

| 1,828,093 | 10/1931 | Ailman | 73/706 |
| 2,587,304 | 2/1952 | Fiske et al. | 73/706 |
| 3,031,591 | 4/1962 | Cary et al. | 73/754 |
| 3,886,792 | 6/1975 | Change et al. | 73/167 |
| 4,379,405 | 4/1983 | Engeler et al. | 73/167 |

Primary Examiner—Stewart J. Levy
Assistant Examiner—John E. Chapman, Jr.
Attorney, Agent, or Firm—Saul Elbaum; Thomas E. McDonald; Anthony T. Lane

[57] ABSTRACT

The invention involves the design of a piezoelectric pressure transducer used for measuring pressure-time characteristics in gun tubes during the propellent ignition and burning process. The transducer utilizes one or two Z-cut tourmaline crystals as the piezoelectric pressure sensing element which produces a finite amount of electrical charge for a given change in pressure. The tourmaline crystals are incapsulated in a mechanical fixture which provides means for mounting in the gun tube, electrical terminals for connecting to signal conditioning and recording instrumentation, and insulators for electrically insulating the transducer from the weapon ground. A needle valve is also incorporated in the transducer which provides means for replenishing the thermal protecting material around the crystal assembly without removing the transducer from the weapon.

8 Claims, 5 Drawing Figures

BALLISTICS PRESSURE TRANSDUCER

RIGHTS OF THE GOVERNMENT

The invention described herein may be manufactured, used or licensed by or for the government of the United States of America for governmental purpose without payment to me of any royalties thereon.

BACKGROUND OF THE INVENTION

The continuous measurement of pressure at strategic locations in a gun tube during the propellant ignition and burning process produces pressure-time curves which are used to evaluate system performance and safety. During the past several years the accuracy and reliability of these pressure measurements have become increasingly more critical due to the development of high performance weapon systems requiring more stringent design tolerances and optimum safety limit determinations. The pressure transducer is normally the major source of error in any ballistics pressure measurement system because of the adverse environment in which the transducer has to perform. One of the major problems encountered is shielding the pressure sensing element of the transducer from heat and residue generated by the burning propellant. There are a variety of methods used to provide this shielding on conventional transducers and the tendency is to over protect which also affects the frequency response and accuracy of the transducer. In some cases a thin layer of ceramic, asbestos, mica and/or modeling clay is used in conjunction with a high temperature grease. In order to maintain the required quality of data, the conventional transducers have to be removed from the weapon after every one to ten rounds (depending on the design of the transducer and firing conditions) for cleaning, recalibrating and replacing the shielding materials. This is a time consuming operation and frequently interferes with the firing schedule. The only thermal protection required on this new pressure transducer is a high temperature, general purpose chassis grease which can be quickly applied through a specially designed needle valve without removing the transducer from the weapon. This method of applying grease also flushes out propellant residue.

The design of this new transducer also allows the pressure sensing element to be electrically insulated from the weapon which eliminates ground loops and improves the signal-to-noise ratio. Differences in ground potential between the weapon and instrumentation chassis ground produce ground loops which appears as noise on the pressure-time signal. This condition can be very difficult to correct with conventional pressure transducers and normally causes delays in testing or loss of data if the noise is initiated by the firing pulse on electrically fired weapons.

Another advantage of this invention is that it utilizes tourmaline crystals [(Na, Ca) (Li, Mg, Fe, Al) (Al, Fe)$_6$ B$_6$Si$_6$O$_{27}$ (O, OH, F)$_4$], which have approximately ten times the output of the more common quartz piezoelectric pressure transducers. This increases the measurement resolution and further improves the signal-to-noise ratio. The tourmaline crystal is also hydrostatically sensitive to pressure; therefore, no piston-cylinder assembly or flush diaphragm is required to transfer the force from the pressure source to the crystal. This feature eliminates what is referred to as "torque sensitivity" because the crystal assembly is completely surrounded by the pressure source which prevents stresses from being transferred to the crystal assemby due to the mounting torque. The primary objections to the use of tourmaline pressure transducers in the past have been their susceptibility to damage during firing, excessive maintenance/calibration requirements and difficulty in miniaturizing the crystal assembly for use in the smaller weapons such as the 20 MM. These problems have been solved with this new design.

SUMMARY OF THE INVENTION

A piezoelectric pressure transducer was designed for acquiring more accurate and reliable transient pressures measurements in gun tubes up to 120K PSI. The transducer is comprised of four basic components: pressure sensing element, element retainer, needle valve, and transducer body. The pressure sensing element utilizes one or two Z-cut tourmaline piezoelectric crystals, depending on the desired output level, mounted on a threaded base with a negative charge collector and encapsulated in a thin metal cap which serves as the positive charge collector. The crystals produce a finite amount of electrical charge for a given change in pressure. The two charge collectors terminate in a standard coaxial electrical connector at the threaded end of the base. The element retainer is used to secure the pressure sensing element in the transducer body and also serves as a coaxial feed-thru adaptor for connecting the electrical output of the transducer to signal conditioning/recording instrumentation. The pressure sensing element and retainer assembly are also electrically insulated from the transducer body by the use of two insulating washers and an insulating sleeve. The transducer body features a threaded portion and pressure seal surface for mounting in the sidewall of the gun tube and a threaded hole for inserting the needle valve. The needle valve opens a passage to the transducer pressure sensing cavity which allows for the injection of high temperature grease for thermal protection of the pressure sensing element and for flushing out propellant residue without removing the transducer from the weapon.

OBJECTS OF THE INVENTION

It is an object of this invention to provide a pressure transducer for the continuous measurement of pressure at strategic locations in a gun tube during the propellant ignition and burning process.

It is another object of this invention to provide a pressure transducer which is shielded from heat and residue generated by the burning propellant.

Another object of this invention is to provide a pressure transducer where the only thermal protection required is high temperature greases which can be quickly applied through a needle valve without removing the transducer from the weapon.

A further object of this invention is to provide a pressure transducer which can remain in the weapon for a large number of rounds without removal.

An object of this invention is to provide a pressure transducer in which the pressure sensing element is electrically insulated from the weapon so as to eliminate ground loops and to improve the signl-to-noise ratio.

Lastly, it is an object of this invention to provide a pressure transducer which utilizes tourmaline crystals.

DETAILED DESCRIPTION OF THE PREFERRED EMBODIMENTS

Figure 1:
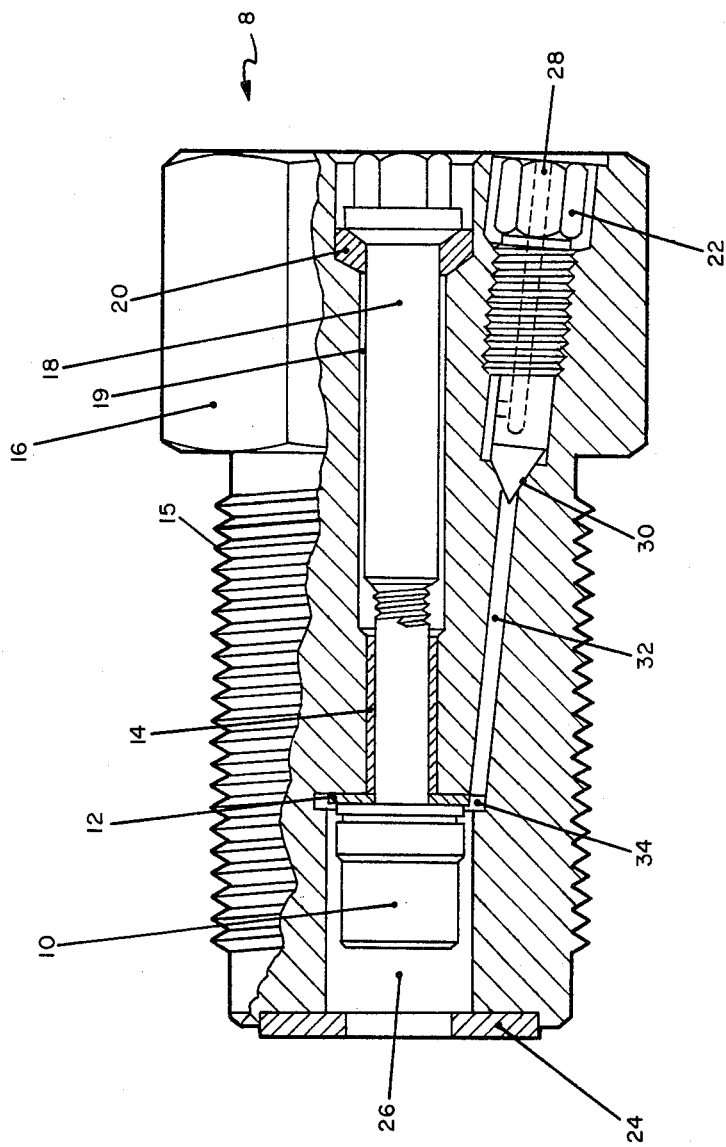
FIG. 1 is a cutaway view of the pressure transducer showing the assembly of the pressure sensing element, element retainer, electrical insulator, needle valve, and pressure seal.

Referring to FIG. 1, there is shown a cutaway view of a preferred embodiment of the present invention. Transducer body 8 is comprised of a head 16 and a screw thread 15. Mounted within the central bore 19 of transducer body 8 is element retainer 18 which is separated from transducer body 8 by means of insulating ring 20. Attached to one end of element retainer 18 is pressure sensing element 10, which extends through central bore 19 and into pressure chamber 26 of transducer body 8. Pressure sensing element 10 is separated from transducer body 8 by means of insulating washer 12 and insulating sleeve 14. Insulating washer 12, insulating sleeve 14, and insulating ring 20 all act to electrically insulate pressure sensing element 10 and element retainer 18 from transducer body 8. Pressure chamber 26 is partially sealed by pressure seal 24, which comprises a metal washer and which is used to prevent gas leakage.

During use, pressure chamber 26 is filled with a high temperature grease which is injected through needle valve 22 with a standard grease gun, not shown, which is equipped with a socket driven attachment to open and close the needle valve. When needle 22, which is screwed into head 16 of transducer body 8, is opened, grease can travel through the center hole 28 of the needle valve 22, around the valve seat 30, and down the access hole 32. The grease then fills recessed cavity 34 and flows into pressure chamber 26. The recessed cavity 34 allows the grease to completely surround the pressure sensing element 10 before proceeding into the pressure chamber 26, which provides a more uniform flushing action and reduces air pockets.

Figure 2:
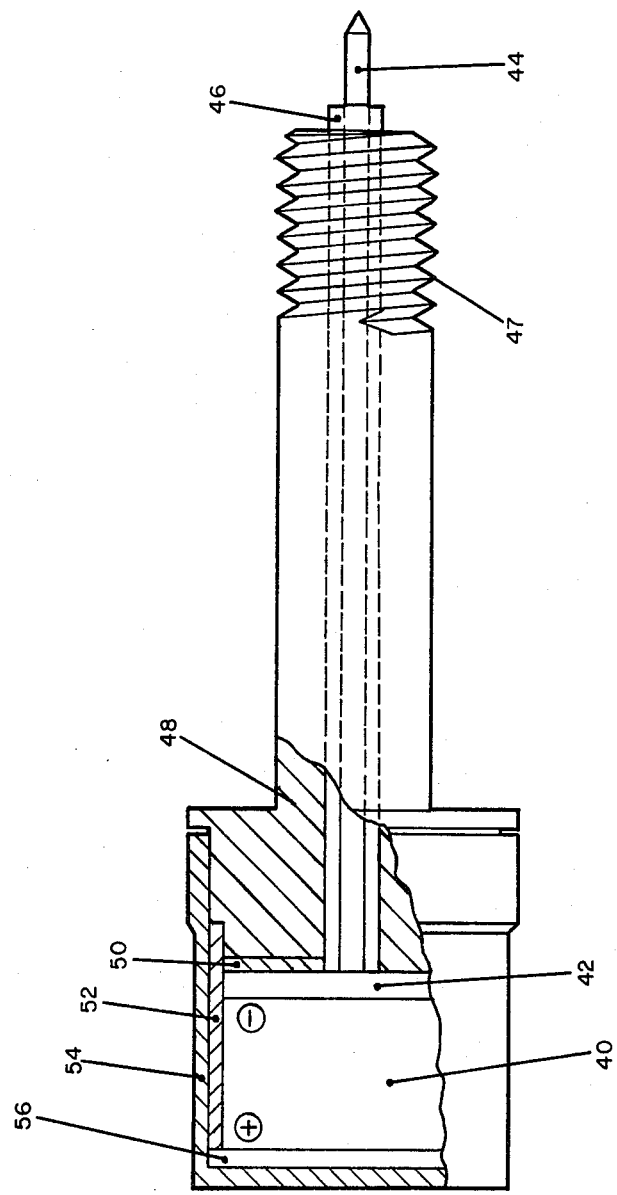
FIG. 2 is a cross section of the pressure sensing element illustrating the single crystal configuration.

There are two basic types of pressure sensing elements employed in the transducer. One uses a single crystal and the second uses a double crystal configuration. Referring now to FIG. 2, there is shown a cutaway view of the pressure sensing element wih the single crystal configuration. Tourmaline crystal disc 40 is mounted within ground cap 54, between positive charge collector 56 and negative charge collector 42. The charge collectors 42 and 56 are metal discs attached to the positive and negative faces of crystal 40 by means of conductive epoxy. The charge generated at the positive face of crystal 40 is transmitted through ground cap 54 and crystal base 48 which terminates in a standard electrical coaxial connector. The coaxial connector comprises screw thread 47 and center conductor 44. The charge generated at the negative face of the crystal 40 is transmitted through center conductor 44 which is soldered to the center of the negative charge collector 42. The positive and negative terminals of the pressure sensing element are electrically insulated from each other by the crystal insulator 52, insulating washer 50, and insulating sleeve 46.

Figure 3:
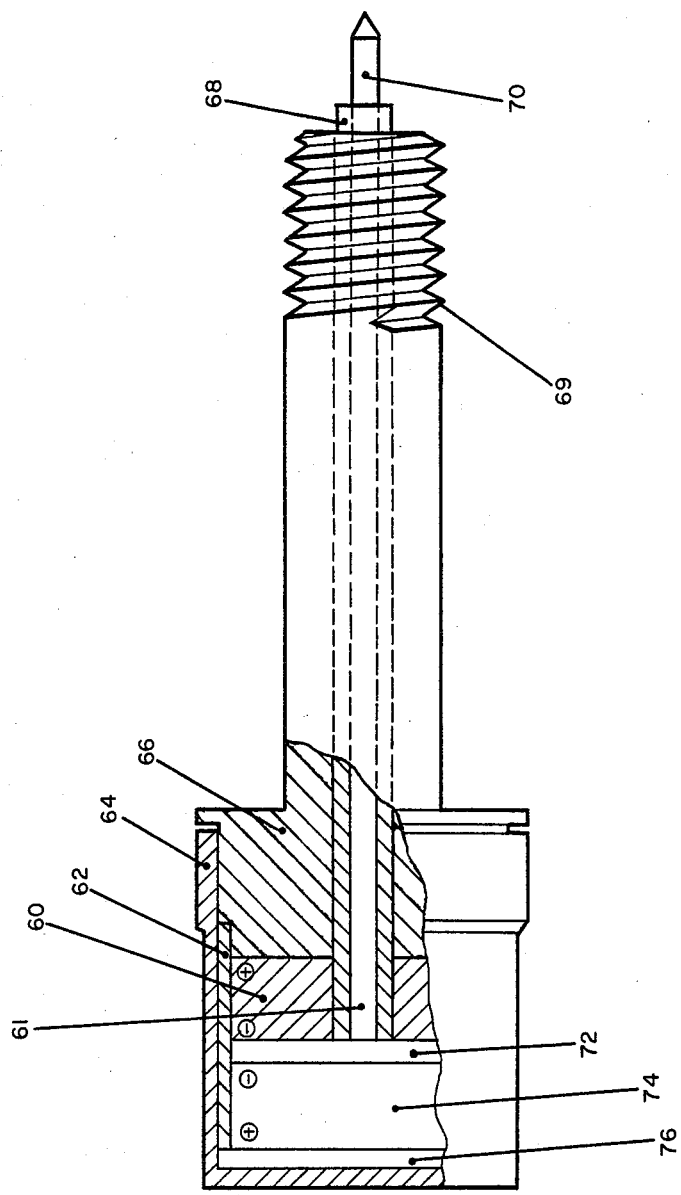
FIG. 3 is a cross section of the pressure sensing element illustrating the double crystal configuration.

Referring now to FIG.3, there is shown a cutaway view of the pressure sensing element with the double crystal configuration. Primary tourmaline crystal 74 is a solid disc and is mounted within ground cap 64, and positive charge collector 76 and negative charge collector 72 are attached to it by means of electrically conductive epoxy. Secondary tourmaline crystal 60 is a solid disc and is also within ground cap 64 and is attached to the other side of negative charge collector 72 by means of electrically conductive epoxy. Secondary crystal 60 has a small hole 61 drilled through its center from face to face to allow passage of center conductor 70 and insulating sleeve 68. Center conductor 70 is contained within insulating sleeve 68. The two crystals are connected electrically in parallel and share the same negative charge collector 72. The positive face of the secondary crystal 60 is attached directly to crystal base 66 by means of conductor epoxy. The charge generated at the positive face of the primary crystal 74 is transmitted through the ground cap 64 to the crystal base 66 where it combines with the charge generated at the positive face of the secondary crystal 60. The charge generated by the negative faces of crystals 60 and 74 is transmitted through the center conductor 70. The crystal base 66 and center conductor 70 terminate in an electrical coaxial connector. The coaxial connector comprises screw thread 69 and center conductor 70. The positive and negative terminals of the element are electrically insulated from each other by the crystal insulator 62 and by insulating sleeve 68.

Figure 4:
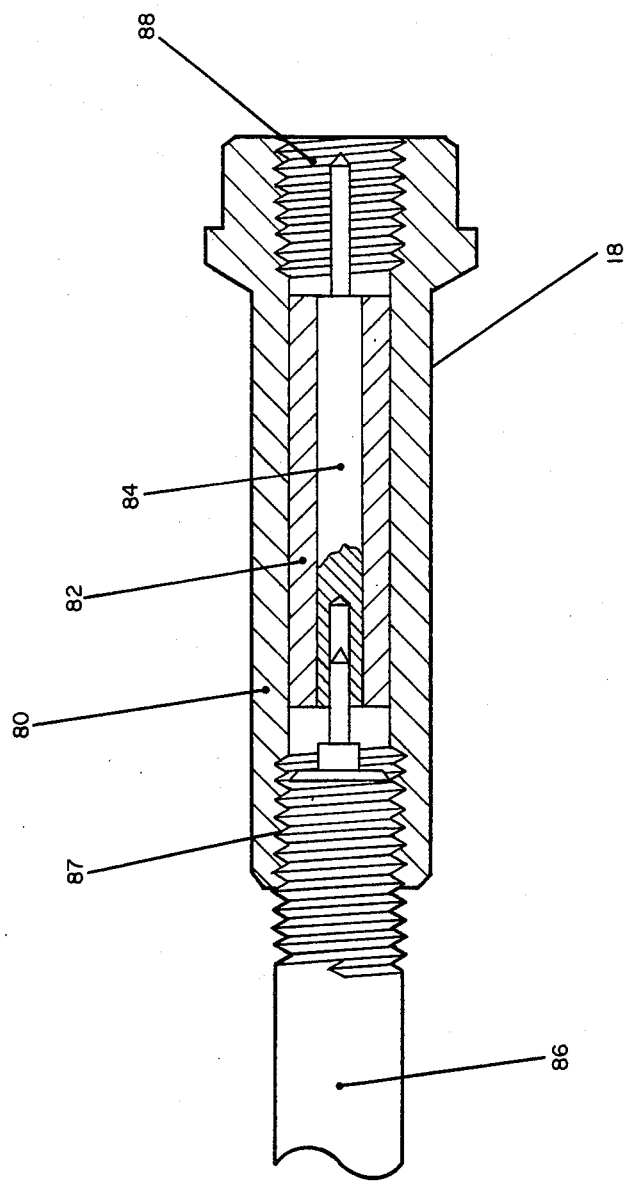
FIG. 4 is a cutaway view of the element retainer illustrating its interface with the pressure sensing element.

FIG. 4 shows a cross section of the element retainer 18 interfaced with the pressure sensing element 86. The element retainer 18 comprises a retainer housing 80, an insulating sleeve 82 disposed within the retainer housing, and a center conductor 84 disposed within the insulating sleeve. Also contained within the element retainer 18 are electrical coaxial connectors 87 and 88. The element retainer is simply an electrical coaxial feed-through adaptor which holds the pressure sensing element in place and which terminates in a standard electrical coaxial connector.

Figure 5:
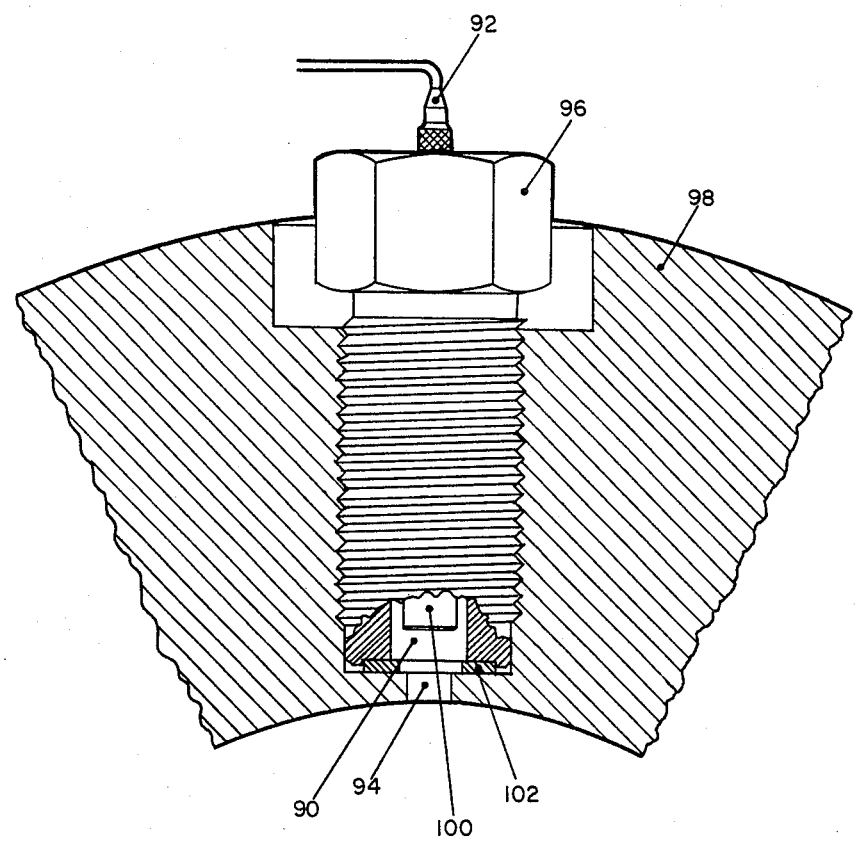
FIG. 5 shows the pressure transducer inserted in the sidewall of a gun tube.

FIG. 5 shows the pressure transducer 96 in a typical mounting configuration in the sidewall of a gun tube 98. The pressure generated by the burning propellant enters the cavity 90 surrounding the pressure sensing element 100 through pressure port 94 which is opened into the weapon chamber. Pressure seal 102 is a metal washer used to prevent gas leakage. A standard electrical coaxial connector and cable 92 is used to transmit the output of the transducer to appropriate signal conditioning and recording equipment.

While the invention has been described with reference to the accompanying drawings, I do not wish to be limited to the details shown therein as obvious modifications may be made by one of ordinary skill in the art.

I claim:

1. A ballistics pressure transducer for use in gun tubes during the propellant ignition and burning process of ordnance projectiles comprising:
   a. a pressure transducer body having a central bore mounted within the sidewall of a gun tube;
   b. means for continuously sensing pressure within the gun tube, said means mounted within the central bore of said pressure transducer body;
   c. means for shielding said sensing means from heat and propellant residue;
   d. means for electrically insulting said sensing means from the gun tube;

e. a pressure chamber surrounding said means for continuously sensing pressure, said pressure chamber having an opening into the interior section of the gun tube;

f. a pressure seal to partially seal said opening of pressure chamber; and g. means for injecting high temperature grease into said pressure chamber.

2. The device of claim 1 wherein said means for continuously sensing pressure comprises:

a. a ground cap;

b. a tourmaline piezoelectric crystal disc having a positive face, a negative face, and an edge, and being disposed within said ground cap;

c. a positive charge collector in electrical contact with said ground cap and the positive face of said crystal, said positive charge collector being disposed within said ground cap;

d. a negative charge collector disposed within said ground cap and in electrical contact with the negative face of said crystal;

e. means to insulate said ground cap from electrical contact with the edge and negative face of said crystal and with said negative charge collector; and f. means for removing the electrical signal generated by said crystal from said ground cap and from said negative charge collector.

3. The device of claim 1 wherein said means for continuously sensing pressure comprises:

a. a ground cap;

b. a primary tourmaline piezoelectric crystal disc disposed within said ground cap and having a positive face, a negative face, and an edge;

c. a positive charge collector disposed within said ground cap and in electrical contact with the positive face of said primary crystal and said ground cap;

d. a secondary tourmaline piezoelectric crystal disc disposed within said ground cap and having a positive face, a negative face, and an edge;

e. a negative charge collector disposed within said ground cap and in electrical contact with the negative face of said primary crystal and the negative face of said secondary crystal;

f. means to insulate said ground cap from electrical contact with the edge and negative face of said primary crystal and of said secondary crystal, and with said negative charge collector;

g. means for connecting said primary and secondary crystals in parallel electrical connection; and h. means for removing the electrical signal generated by said primary and secondary crystals from said ground cap and from said negative charge collector.

4. The device of claim 1 wherein said means for electrically insulating said sensing means from the gun tube comprises:

a. an insulating washer for electrically insulating the means for continuously sensing pressure from the pressure transducer body; and b. an insulating sleeve for electrically insulating the means for continuously sensing pressure from the pressure transducer body.

5. The device of claim 1 further comprising an element retainer mounted within the central bore of the pressure transducer body for holding the pressure sensing means in place and for facilitating electrical connection to it, said element retainer having an electrically conductive retainer housing, a center conductor disposed within the retainer housing, an an insulating sleeve for insulating the center conductor from the retainer housing.

6. The device of claim 5 wherein said means for electrically insulating said sensing means from the gun tube comprises:

a. an insulating ring for electrically insulating the element retainer from the pressure transducer body;

b. an insulating washer for electrically insulating the means for continuously sensing pressure from the pressure transducer body; and c. an insulating sleeve for electrically insulating the means for continuously sensing pressure from the pressure transducer body.

7. A ballistics pressure transducer for use in gun tubes during the propellant ignition and burning process of ordnance projectiles comprising:

a. a pressure transducer body having a central bore mounted within the sidewall of a gun tube;

b. a pressure chamber, said pressure chamber having an opening into the interior section of the gun tube and another opening into the central bore of said pressure transducer body;

c. a pressure seal to partially seal the opening into the interior section of the gun tube of said pressure chamber;

d. means for injecting high temperature grease into said pressure chamber;

e. a ground cap, said ground cap being mounted in said pressure chamber;

f. a tourmaline piezoelectric crystal disc having a positive face, a negative face, and an edge, and being disposed within said ground cap;

g. a positive charge collector disposed within said ground cap and in electrical contact with the positive face of said crystal and said ground cap;

h. a negative charge collector disposed within said ground cap and in electrical contact with the negative face of said crystal;

i. means to insulate said ground cap from direct electrical contact with the edge and negative face of with said crystal and said negative charge collector;

j. means for removing the electrical signal generated by said crystal from said ground cap and from said negative charge collector; and k. means for electrically insulating the ground cap, and the electrical signal generated by the crystal, from the gun tube.

8. A ballistics pressure transducer for use in gun tubes during the propellant ignition and burning process of ordnance projectile comprising:

a. a pressure transducer body having a central bore mounted within the sidewall of a gun tube;

b. a pressure chamber, said pressure chamber having an opening into the interior section of the gun tube and another opening into the central bore of said pressure transducer body;

c. a pressure seal to partially seal the opening into the interior section of the gun tube of said pressure chamber;

d. means for injecting high temperature grease into said pressure chamber;

e. a ground cap, said ground cap being mounted in said pressure chamber;

f. a primary tourmaline piezoelectric crystal disc disposed within said ground cap and having a positive face, a negative face, and an edge;

g. a positive charge collector disposed within said ground cap and in electrical contact with the positive face of said primary crystal and said ground cap;

h. a secondary tourmaline piezoelectric crystal disc disposed within said ground cap and having a positive face, a negative face, and an edge;

i. a negative charge collector disposed within said ground cap and in electrical contact with the negative face of said primary crystal and the negative face of said secondary crystal;

j. means to insulate said ground cap from electrical contact with the edge and negative face of said primary crystal and of said secondary crystal, and with said negative charge collector;

k. means for connecting said primary and said secondary crystals in parallel electrical connection;

l. means for removing the electrical signal generated by said primary and secondary crystals from said ground cap and from said negative charge collector; and m. means for electrically insulating the ground cap, and the electrical signal generated by the primary and secondary crystals, from the gun tube.

* * * * *